Patented Apr. 29, 1924.

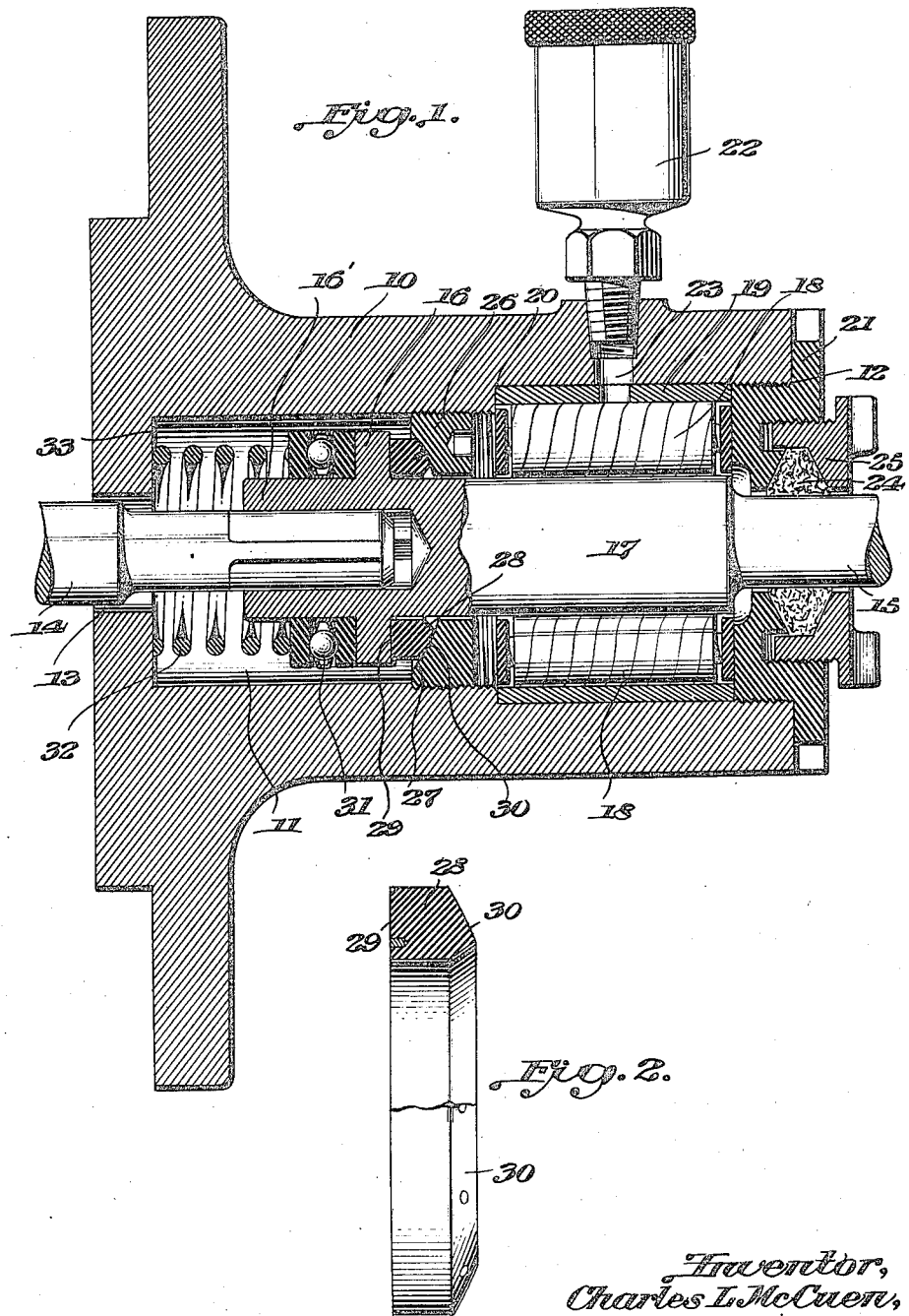

1,491,992

UNITED STATES PATENT OFFICE.

CHARLES L. McCUEN, OF DETROIT, MICHIGAN, ASSIGNOR, BY MESNE ASSIGNMENTS, TO DELCO-LIGHT COMPANY, OF DAYTON, OHIO, A CORPORATION OF DELAWARE.

SHAFT SUPPORT.

Application filed December 19, 1918. Serial No. 267,447.

*To all whom it may concern:*

Be it known that I, CHARLES L. McCUEN, a citizen of the United States, and resident of Detroit, Wayne County, State of Michigan, have invented certain new and useful Improvements in Shaft Supports, of which the following is a specification.

This invention relates to shaft supports and particularly to a novel arrangement of a driving shaft and its mounting and packing.

One of the objects of the invention is to provide a rotating driving shaft with a supporting bearing and a thrust seal or packing at one side of the bearing and an annular packing at the other side thereof.

Another object of the invention is to provide a shaft with a novel form of thrust packing forming a seal to prevent escape of liquid lengthwise of the shaft.

Other objects of the invention will appear from the following description taken with the drawings, in which:

Fig. 1 is a longitudinal sectional view through a shaft support made in accordance with this invention; and Fig. 2 is an enlarged detail view of the packing ring shown in Fig. 1.

The illustrative form of the invention shown in these drawings comprises a driving shaft and support such as may be used for driving a pump for refrigerating machines. In such use it is necessary to pack the driving shaft to prevent escape of the refrigerant by leakage along the rotating shaft.

As shown therefor, 10 represents a support which may be attached to a refrigerating pump or compressor. This support has an elongated recess 11 formed therein, its outer end being at 12 and its inner end at 13. The opening at said inner end 13 is somewhat contracted as shown, but still it provides clearance for the driven part 14 of a two-part shaft 14—15, the driving part 15 of said shaft being inserted into the recess from the end 12. The shaft 14—15 telescopes as shown at 16' within the recess, so that the part 15, with or without its support, may be bodily withdrawn from connection with the shaft part 14. Also the shaft part 15 is free to move endwise slightly in the support without affecting the driving relation of the shaft parts, for a purpose hereinafter described.

The shaft part 15 is formed with a flange 16 adjacent its joint with the part 14, and with a bearing part 17 which extends nearly half the length of the recess between the flange 16 and the outer end of said recess. An elongated bearing 18 surrounds the bearing part of the shaft and forms its sole rotative mounting in the support 10. Said bearing is shown as of the cylindrical roller type but it will be understood that other forms of roller bearings, or equivalent ball bearings, may be used. The outer race 19 of the bearing 18 is retained in the recess 11 by clamping between a shoulder 20 and a threaded annulus 21 in the outer end 12 of the recess.

Oil or other lubricant is fed to the bearing 18 by an oiler 22 connecting through an opening 23, and it is prevented from escaping along the shaft 15 by an annular packing 24 retained by a collar 25 threaded into the annulus 21.

It will be understood that by reason of the clearance around the shaft part 14 the inner end of the recess 11 is in communication with the pump or compressor which is driven by the shaft 14. A novel and effective form of thrust packing or seal is provided in this part of the recess to prevent the refrigerant or other liquid passing along the shaft to the bearing 18. This packing is arranged at the left hand side of the bearing, as shown in the drawing, or between the flange 16 on the shaft part 15 and said bearing.

A collar 26, slightly larger than the bearing part 17 of the shaft 15, is threaded into the recess beyond the shoulder 20, and on its side adjacent the flange 16 this collar has a spherical ground seat 27 as shown. A floating packing ring 28 is arranged between the flange 16 and the collar 26, the flat face 29, as shown in Fig. 2, seating against the flat side of the flange 16, and the spherical face 30 seating against the corresponding surface or seat 27 on the collar 26. A thrust bearing 31 of the ball type rests against the opposite face of the flange 16 and a spring 32 is arranged between this bearing and an abutment or part 33 of the support. The shaft part 15 therefore is constantly spring pressed toward the right in Fig. 1, independently of the shaft part 14, and the floating ring 28, with its nicely ground contacting faces, keeps a sealed joint between the flange 16 and the ring 26. In addition to preventing leakage of liquid into the bearing 18, the packing 28 also prevents escape of oil therefrom on that side of the bearing, and the packing 24 prevents escape on the other side thereof.

Having thus described my invention, what I claim and desire to secure by Letters Patent is:—

1. The combination with a support having an elongated cylindrical recess therein, of a shaft extending into said recess and having a bearing part and a flange, a roller bearing in said recess surrounding the bearing part of said shaft, a collar in said recess between the bearing and said flange, a packing ring between said collar and flange, and a spring between said flange and a part of said support.

2. The combination with a support having an elongated cylindrical recess therein, of a shaft extending into said recess and having a bearing part and a flange, a roller bearing in said recess surrounding the bearing part of said shaft, a collar in said recess between the bearing and said flange, a packing ring between said collar and flange, a thrust bearing resting against said flange, and a spring between said thrust bearing and a part of said support.

3. The combination with a support having an elongated cylindrical recess therein, of a shaft extending into said recess and having a bearing part and a flange, a roller bearing in said recess surrounding the bearing part of said shaft, a thrust packing for the shaft cooperating with said flange, an annular packing around the shaft at the end of the support, and means for feeding oil to the bearing.

4. The combination with a support having a recess therein, of a shaft extending into said recess and having a flange, a spring between a part of said support and said flange tending to press the shaft endwise, a collar loose on the shaft and threaded into the recess adjacent said flange, a packing ring between said flange and said collar and retained in contact with both by the action of said spring, and a bearing rotatively mounting the shaft in said support.

5. The combination with a support having a recess therein, open at both ends, a two-part driving shaft extending through said recess and telescoping each other therein, a bearing in said recess for one of said shaft parts and the other shaft part being wholly out of contact with said support, a thrust packing forming a seal between the part of the recess surrounding the non-contacting part of said shaft and the bearing, means for feeding oil to the bearing, and packing around the supported part of the shafts.

6. The combination with a support having an elongated cylindrical recess therein, of a shaft extending into said recess and having a bearing part and a flange, a roller bearing in said recess surrounding the bearing part of said shaft, a collar in said recess, a packing ring between said collar and flange, and a spring between said flange and a part of said support.

7. The combination with a support having an elongated cylindrical recess therein, of a shaft extending into said recess and having a bearing part thereon, a bearing in said recess surrounding the bearing part of said shaft, a thrust packing between the shaft and support comprising flange and collar members in said recess and carried by said support and shaft, a packing ring between said collar and flange members, and a spring in said recess for pressing said members together.

In testimony whereof I affix my signature.

CHARLES L. McCUEN.